US008924626B2

(12) United States Patent
Cheng et al.

(10) Patent No.: US 8,924,626 B2
(45) Date of Patent: Dec. 30, 2014

(54) PHASED NAND POWER-ON RESET (75) Inventors: Steven S. Cheng, Sunnyvale, CA (US); Dennis Ea, Hayward, CA (US); Jianmin Huang, Sunnyvale, CA (US); Alexander Kwok-Tung Mak, Los Altos Hills, CA (US); Farookh Moogat, Fremont, CA (US)

(73) Assignee: SanDisk Technologies Inc., Plano, TX (US)

( * ) Notice: Subject to any disclaimer, the term of this patent is extended or adjusted under 35 U.S.C. 154(b) by 1027 days.

(21) Appl. No.: 12/770,358

(22) Filed: Apr. 29, 2010

(65) Prior Publication Data

US 2011/0271036 A1 Nov. 3, 2011

(51) Int. Cl.
G06F 12/00 (2006.01)
G06F 1/24 (2006.01)

(52) U.S. Cl.
CPC ...................................... *G06F 1/24* (2013.01)
USPC ........................................................ 711/103

(58) Field of Classification Search
None
See application file for complete search history.

(56) References Cited

U.S. PATENT DOCUMENTS

| 4,928,266 | A | 5/1990 | Abbott et al. |
| 5,801,561 | A | 9/1998 | Wong et al. |
| 6,108,232 | A | 8/2000 | Hennebois et al. |
| 6,150,800 | A | 11/2000 | Kinoshita et al. |
| 7,701,764 | B2 * | 4/2010 | Nguyen .................... 365/185.11 |
| 2002/0085418 | A1 * | 7/2002 | Goto et al. ............... 365/185.11 |
| 2006/0107077 | A1 | 5/2006 | Roth et al. |

FOREIGN PATENT DOCUMENTS

WO  WO 2008/083373  7/2008

OTHER PUBLICATIONS

International Search Report issued in international application No. PCT/US2011/034078, mailed Sep. 1, 2011 (4 pages).
Written Opinion issued in international application No. PCT/US2011/034078, mailed Sep. 1, 2011 (7 pages).

* cited by examiner

Primary Examiner — Brian Peugh
(74) Attorney, Agent, or Firm — Brinks Gilson & Lione (57) ABSTRACT A method and system for phasing power-intensive operations is disclosed. A non-volatile storage device controller detects a power reset. The controller is in communication with non-volatile memories in the non-volatile storage device. In response to detecting a power reset, the controller determines a current consumption necessary to reset the non-volatile memories in the non-volatile storage device. The controller simultaneously resets all of the non-volatile memories when the determined current consumption is less than a current consumption threshold. If the determined current consumption is greater than the current consumption threshold, the controller resets a first subset of the plurality of non-volatile memories, and after a predetermined delay, resets a second subset of the non-volatile memories. Therefore, a power-intensive operation may be performed without exceeding a current consumption threshold by dividing the operation into a sequence of steps that do not exceed the threshold.

16 Claims, 4 Drawing Sheets

PHASED NAND POWER-ON RESET

TECHNICAL FIELD

This application relates generally to the operation of non-volatile flash memory systems, and, more specifically, to a method and system for phasing power-intensive operations.

BACKGROUND

The ever-increasing capacity of small form factor memory cards allows for new possibilities in storing and distributing digital content. Content stored on commercially available cards such as MultiMedia cards (MMC) and Secure Digital (SD) cards may be accessed by a variety of host devices. The organizations that define standards for small form factor memory cards may define a limit for the maximum instantaneous or average power that a memory card may consume. These limits are necessary so that manufacturers of host devices such as cellular telephones may budget the instantaneous or average power necessary for memory card access operations, and are necessary in order to maintain interoperability with future and legacy host devices.

As the storage capacity and complexity of small form factor memory cards increases, the instantaneous or average power potentially consumed by these devices also could increase, particularly during power-intensive operations such as reset, programming, writing, or erase operations. For example, small form factor memory cards typically contain multiple NAND non-volatile memory dies. An operation such as a power-on reset (POR) typically involves resetting several NAND dies in parallel, or approximately at the same time, such as by transmitting a reset command to all of the NAND dies associated with a chip enable signal. Initializing several dies at about the same time may cause a significant amount of combined inrush current, which may exceed an instantaneous power consumption limit, or a maximum permissible power consumption over a defined period of time.

One design approach to achieving power compliance while resetting a large number of non-volatile memories includes a Power-on Read Disable (PRDIS) memory input control, which disables each memory die from initiating its own power-on reset when power is applied to the memory card. This avoids resetting all of the memory dies at the same time as other circuitry on the memory card is reset. However, large numbers of the memory dies are still reset in parallel by the memory card controller after the controller completes initialization. Therefore, PRDIS control is not a viable solution when the current requirements solely for resetting the non-volatile memories in parallel already exceeds a maximum limit established by the standard applicable to a particular small form factor memory card.

Another solution for avoiding large inrush current during power-on of a small form factor memory cards includes staggering the times when each die associated with a common chip enable (CE) line starts initialization. This delay, however, is typically a fixed time that is not programmable. There are limitations to the duration of delays that may be implemented using this approach, and to the ordering of the die initialization that may be achieved using this approach. Therefore, a system that utilizes hard-wired or fixed delays limits the possible configurations that can be used, and requires custom circuitry for each implementation.

SUMMARY

Therefore, it would be advantageous to have a method or system that would permit power-intensive operations to be performed on small form factor memory cards of larger storage densities. Such a method or system would permit small form factor storage cards to have increased storage capacity while still maintaining compliance with power consumption limits established by standards organizations.

In order to address these issues, a method and system is disclosed that identifies a power-intensive operation that would exceed a power consumption limit. The method and system divides the operation into steps or sets of steps to be staggered or performed sequentially, in order to avoid exceeding the power consumption limit that parallel execution of the steps of the power-intensive operation may cause. Specifically, the method or system may determine that a parallel operation would exceed a power consumption limit, and if so, determine how the parallel operation can be broken up into sequential operations or sets of operations, where each sequential operation would not exceed a power consumption limit.

An example of a power-intensive operation may be a power-on reset sequence. In one aspect, a method and system may include sequentially resetting subsets the NAND dies in the device at the same time, instead of resetting all of NAND dies (or all of the NAND dies associated with a chip enable) at the same time. Therefore, a small form factor memory card implementing the method and system could incorporate additional NAND dies, to increase storage capacity, while avoiding power consumption limits associated with a power-on reset or other similarly power-intensive operations.

In one aspect, a controller in a non-volatile storage device resets a non-volatile storage device. The controller is in communication with non-volatile memories in the non-volatile storage device. In response to detecting a power reset, a current consumption necessary to reset the non-volatile memories in the non-volatile storage device is determined. If the determined current consumption is less than a current consumption threshold, the non-volatile memories are simultaneously reset. If the determined current consumption is greater than the current consumption threshold, a first subset of the non-volatile memories are reset, and after a predetermined delay a second subset of the plurality of non-volatile memories are reset. The non-volatile memories are divided into as many subsets as are required, so that each subset may be sequentially reset without exceeding the current consumption threshold.

Determining the current consumption necessary to reset the non-volatile memories in the non-volatile storage device may include determining whether a quantity of the non-volatile memories exceeds a predetermined number, determining the type of the non-volatile memories, or determining a manufacturer of the plurality of non-volatile memories.

In another aspect, a non-volatile storage device includes a non-volatile memories and a controller in communication with the non-volatile memories. The controller can determine a current consumption necessary to reset the non-volatile memories in the non-volatile storage device, in response to detecting a power reset. The controller simultaneously resets the non-volatile memories when the determined current consumption is less than a current consumption threshold. When the determined current consumption is greater than the current consumption threshold, the controller resets a first subset of the plurality of non-volatile memories, and after a predetermined delay resets a second subset of the plurality of non-volatile memories. The controller may divide the non-volatile memories into as many subsets as required, such that resetting any subset of the non-volatile memories does not exceed the current consumption threshold.

As with the previous aspect, determining the current consumption necessary to reset the non-volatile memories in the non-volatile storage device may include determining whether a quantity of the non-volatile memories exceeds a predetermined number, determining the type of the non-volatile memories, or determining a manufacturer of the plurality of non-volatile memories.

In yet another aspect, there is a method for resetting a system. A controller in communication with a set of system components in a system determines a current consumption necessary to reset the set of system components. The determination is in response to detecting a power reset. All of the set of system components are simultaneously reset when the determined current consumption is less than a current consumption threshold. When the determined current consumption is greater than the current consumption threshold, a first subset of system components that can be reset simultaneously without exceeding the current consumption threshold is identified and reset. Then, a second subset of system components that can be reset simultaneously without exceeding the current consumption threshold is identified and reset. This process is repeated until all of the system components in the set are reset.

Determining the current consumption necessary to reset the set of system components in the system may include determining whether a quantity of system components exceeds a predetermined number, determining a type of each of the system components, or determining a manufacturer of each of the system components.

Other aspects and features and advantages thereof are possible and will be, or will become, apparent to one with skill in the art upon examination of the following detailed description and accompanying drawings. Hence, it is intended that the scope of the claimed invention as recited in the claims below will not be limited to the embodiments shown and described herein.

BRIEF DESCRIPTION OF THE DRAWINGS

The components in the figures are not necessarily to scale, emphasis instead being placed upon illustrating various aspects thereof. Moreover, in the figures, like referenced numerals designate corresponding parts throughout the different views.

DETAILED DESCRIPTION

A method and system for performing a phased operation, such as a power-on reset, in order to comply with power consumption limitations is explained in further detail in the exemplary embodiments discussed in the foregoing figures and accompanying description.

A non-volatile storage device, such as a small form factor memory card, typically includes a number of non-volatile memories, such as NAND flash devices or dies. When such a non-volatile storage device is connected to a host device, or when a host device containing a non-volatile storage device is turned on, power may be applied to the non-volatile storage device. During power on, the non-volatile storage device typically performs a Power-On Reset (POR) and initialization that includes reading from ROM fuses in order to prepare each non-volatile memory for operations such as read, write, and erase. These initialization operations consume power. Some non-volatile storage devices contain multiple non-volatile memories or dies. For multiple memory dies and/or components, each die or component may initialize at the same time or at nearly the same time, resulting in a significant amount of combined inrush current to the system. One situation where multiple dies may be reset at about the same time is when multiple dies are connected to a controller using a common chip enable (CE) signal. Each die connected to the same chip enable signal may respond to a single reset command issued by the controller in the non-volatile memory device. As the number of dies sharing a chip enable signal increases, the combined current requirements to perform initialization operations also increases. Other system architectures permitting multiple non-volatile memories to be reset at the same time may experience a similar issue.

The combined current requirements must comply with the standards established by the corresponding small form factor memory card, in order to ensure that the device is compliant with the standard and operable in a variety of host devices that are compliant with the standard. For example, the Memory-Stick small form factor memory card standard limits the maximum system inrush current to 65 milliamps over a 1 millisecond period. In one example, when eight dies controlled by a common chip enable line are simultaneously reset, the combined system inrush current may exceed a small form factor memory card maximum permissible current.

A single memory card controller design advantageously may be used in small form factor memory cards of various storage capacities or with different power consumption standards. In order to address the need for flexible methods and systems that detect current consumption requirements for power-intensive operations, and determine the number of non-volatile devices that a particular operation, such as a power on reset, that may be performed on in parallel, a method and system is disclosed herein that may count the number of non-volatile memory devices, such as NAND dies, associated with a common chip enable (CE) line, and select one NAND die or a group of NAND dies to reset or initialize at a time in a controlled manner that prevents excessive inrush current. Such a method and system may also utilize device characteristics, such as a device part number, or a device manufacturer, to determine the inrush current that would result from simultaneously resetting or performing a power-intensive operation on two or more devices, and perform the operation only on the number of devices that would avoid the combined system inrush current from exceeding a power consumption threshold established by a small form factor card standard.

A flexible controller in accordance with an embodiment of such a system and method may be connected to any number of non-volatile memories having different characteristics and manufacturers, and the controller may intelligently compute a strategy for sequentially completing a power-intensive operation across all of the non-volatile devices in order to avoid a combined system inrush current from exceeding a maximum.

Figure 1:
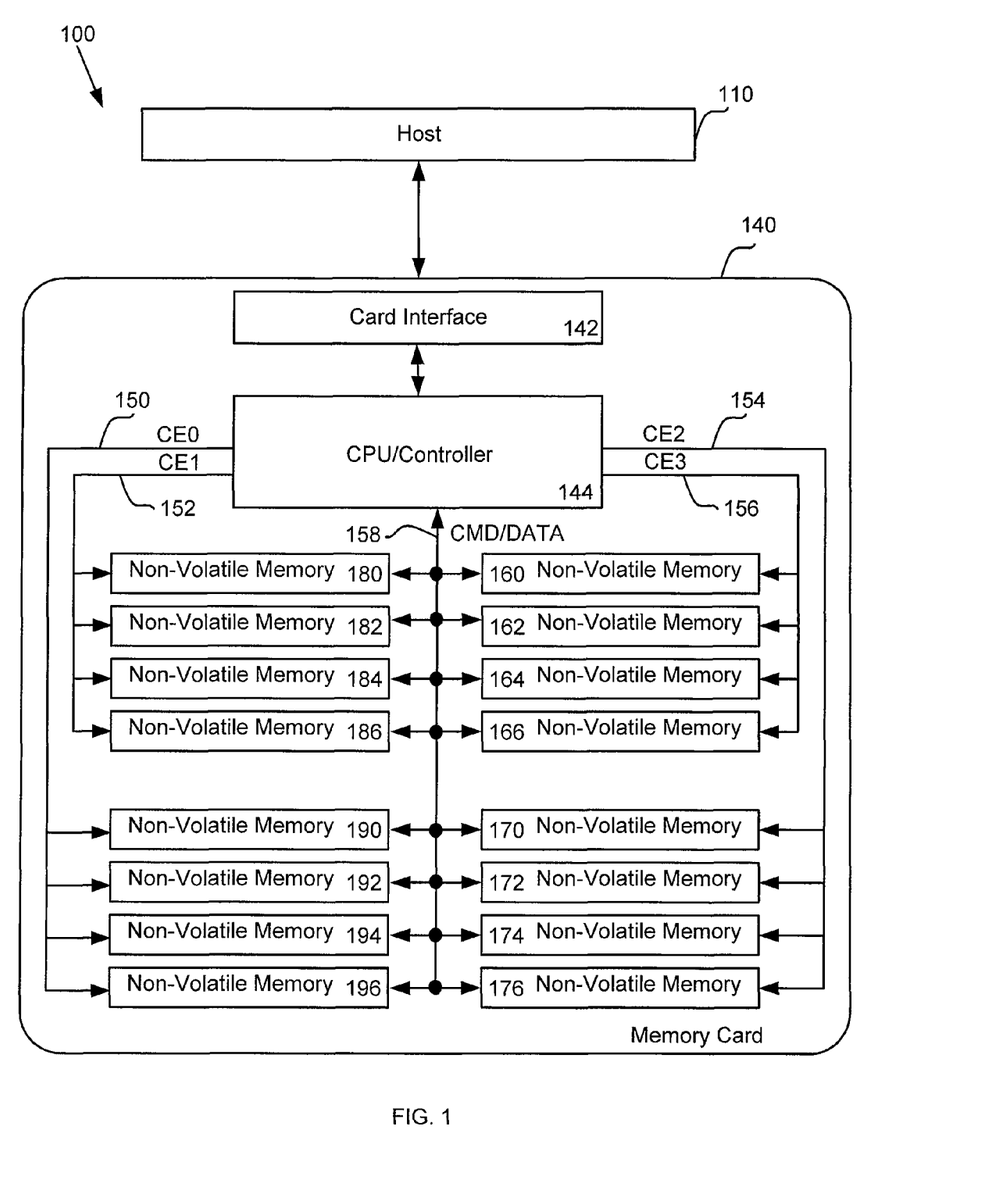
FIG. 1 is a diagram illustrating an exemplary system for performing a phased operation in a non-volatile storage device.

FIG. 1 is a diagram illustrating an exemplary system 100 for performing a phased operation in a non-volatile storage device. The exemplary system 100 includes a host 110 in communication with a non-volatile memory device 140. Examples of a host 110 include personal computers, notebook computers, personal digital assistants, various state adjudication devices, digital cameras, cellular telephones, portable audio players, automobile sound systems, and similar types of equipment. The non-volatile memory device 140 may be a removable small form factor memory card, such as a Secure Digital (SD) or MultiMedia Card (MMC). While the system 100 shows a removable non-volatile memory device 140, other embodiments may include a non-volatile memory device 140 permanently installed within or affixed to the host 110.

The non-volatile memory device 140 includes a card interface 142, a central processing unit (CPU) or controller 144, and a number of non-volatile memories 160, 162, 164, 166, 170, 172, 174, 176, 180, 182, 184, 186, 190, 192, 194, and 196. The card interface 142 receives commands from the host 110, and exchanges data and results with the host 110. For example, the card interface 142 may receive commands from the host to read data stored in the non-volatile memory device 140, store data in the non-volatile memory device 140, or perform other operations such as erasing or formatting the card. The commands and data exchanged between the host 110 and the non-volatile memory device 140 may be in accordance with a small form factor memory card interface standard. The card interface 142 exchanges commands and data with the controller 144, which in turn, exchanges commands and data with the non-volatile memories 160-186 in order to complete the request by the host 110.

The card interface 142 and the controller 144 may be implemented in hardware, firmware, software, or any combination thereof, arranged to implement the functionality of the card interface 142 and the controller 144, respectively, such as the functionality described in the embodiments of FIGS. 1-4 and the accompanying text. In one embodiment, the functionality of the controller 144 is implemented utilizing a processor configured with processor executable instructions. The processor executable instructions may be stored in random access memory (RAM) within the non-volatile memory device 140, or non-volatile memory, such as a read-only memory (ROM), EEPROM (Electrically Erasable and Programmable Read Only Memory), or E-flash (embedded flash) within the non-volatile memory device 140.

The non-volatile memories 160-196 may be any type of available non-volatile storage device. One example of such a device is Toshiba SLC NAND flash part number TC58NVG2S3ETA00. Similar non-volatile memory devices are available from other manufacturers. The controller 144 may initiate other operations without direction from the host 110, such as operations to initialize or maintain data and the non-volatile memories 160-196.

The non-volatile memories 160-196 may be divided into groups or sets, were each group or set shares a chip enable (CE) signal 150, 152, 154, 156. Referring to FIG. 1, chip enable zero (CE0) is shared by non-volatile memories 190, 192, 194, and 196. The controller 144 may simultaneously send a command to all of the non-volatile memories 190, 192, 194, and 196 by asserting the chip enable zero (CE0) signal 150 and transmitting a command on the command/data bus 158. For example, for the Toshiba SLC NAND flash part number TC58NVG2S3ETA00 non-volatile memory, the command 0xFF (reset) is transmitted to the non-volatile memory on the command/data bus 158 while asserting the chip enable signal communicatively coupled to the non-volatile memory die. In this example, all of the non-volatile memory devices 190, 192, 194, and 196 sharing a single chip enable signal 150 will be reset when the reset command is transmitted on the command/data bus 158 in the chip enable signal is asserted.

While FIG. 1 shows a non-volatile storage device 140 where a chip enable is shared by four non-volatile memories, other configurations are possible. For example, a chip enable may be connected to two, six, eight, or any number of non-volatile memories. As the number of non-volatile memories coupled to a single chip enable signal increases, the combined power consumption associated with a command simultaneously executed by all the devices coupled to that chip enable, such as reset, also increases. Connecting too many non-volatile memory devices to a single chip enable may result in a power consumption limit being exceeded when a parallel commands such as reset (0xFF) is approximately simultaneously executed by each non-volatile memory connected to a shared chip enable.

In one embodiment, the command set of the non-volatile memory devices 160-196 is extended to allow a die-specific reset command, such as command 0xXX, where 0xXX is a byte value, to selectively initiate each non-volatile memory 160-196 as required in order to limit the number of non-volatile memories initializing at any one time. By limiting the number of non-volatile memories initializing at any one time, the amount of inrush current at any instant during the non-volatile storage device 140 initialization process may be controlled in order to avoid exceeding a power consumption limit established by a small form factor memory card standard. Referring to FIG. 1, a die-specific reset command may allow the controller 144 to reset any number of devices connected to a single chip enable. For example, the controller 144 may reset any combination of one, two, three, or four non-volatile memories 190, 192, 194, 196 communicatively coupled to chip enable zero (CE0) 150. In one embodiment, the particular non-volatile memory may include a die-specific reset command and a generic reset command, where the die-specific reset command may reset one specified non-volatile memory at a time, and the generic reset command (0xFF) may then be used to reset the remaining non-volatile memories associated with a chip enable that were not already reset using the die-specific reset command. In the alternative, any combination of non-volatile memories may be reset using available device-specific reset commands.

Architectures other than the shared chip enable and data command bus structure shown in FIG. 1 may also limit the ability of the controller 144 to select which of the non-volatile memories 160-196 may simultaneously act in response to a command such as reset. Similar architectural modifications to allow the controller to identify subsets of the non-volatile memories 160-196 that will execute a parallel command are in accordance with the embodiments described herein.

Figure 2:
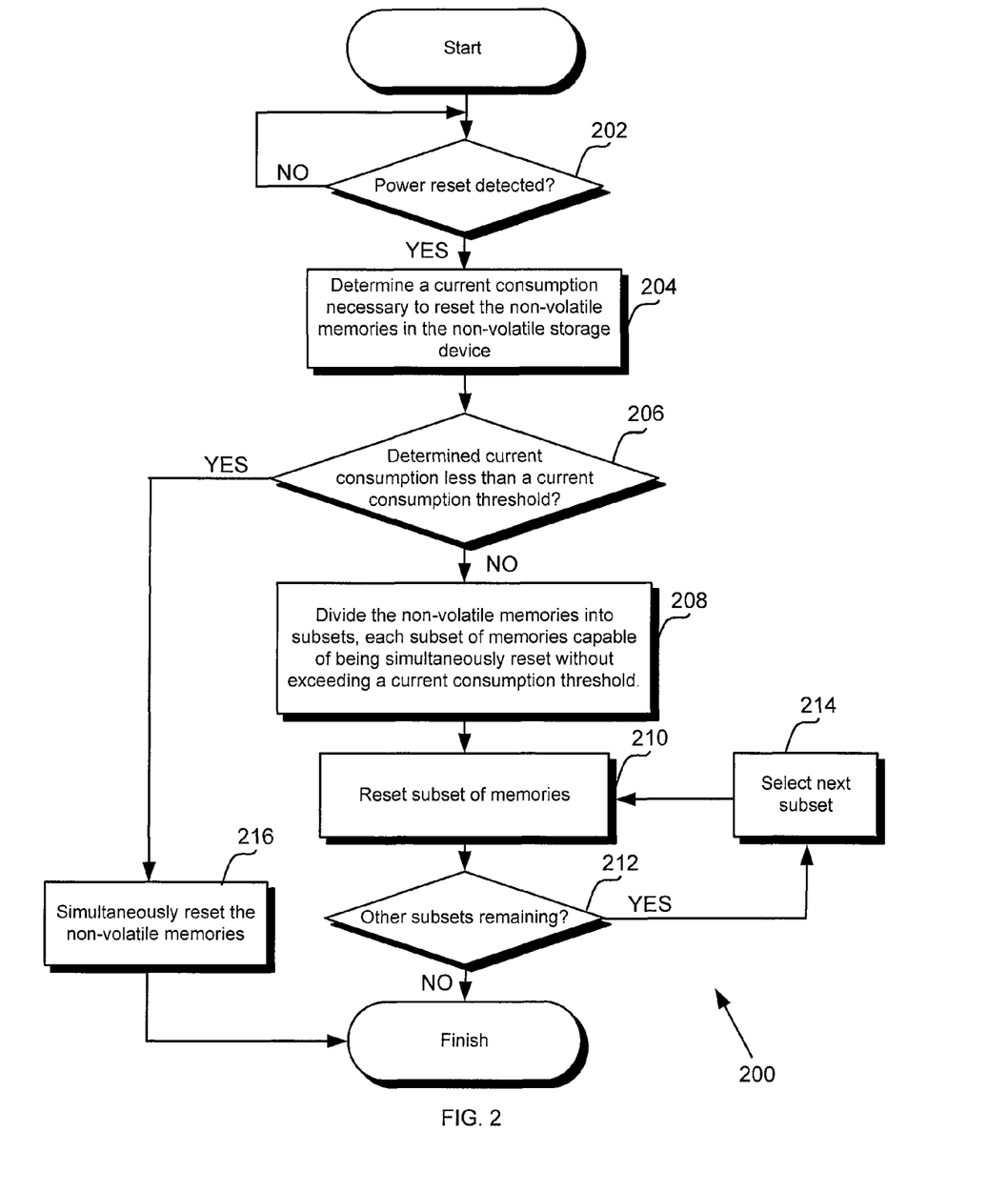
FIG. 2 shows exemplary steps for performing a phased operation in the non-volatile storage device of FIG. 1.

FIG. 2 shows exemplary steps 200 for performing a phased operation in the non-volatile storage device of FIG. 1. The exemplary steps may be performed, for example, by the controller 144 of FIG. 1. Control begins at step 202. If a power reset is not detected the controller 144 in step 202, control remains at step 202 until a power reset occurs. The controller 144 may detect a power reset, for example, when a reset command is received by the controller 144 from the host 110 or another source within the non-volatile storage device 140, or when code execution begins in response to the application of power to the non-volatile storage device 140. When a power reset is detected by the controller 144, control passes from step 202 to step 204.

In step 204, the controller 144 determines the current consumption necessary to reset the non-volatile memories in the non-volatile storage device 140. This determination may include determining the power consumption associated with resetting all of the non-volatile memories that the controller is capable of simultaneously resetting. For example, in the architecture shown in FIG. 1, this determination may comprise the power consumption associated with resetting the non-volatile memories coupled to a single chip enable, as the architecture shown in FIG. 1 may permit the controller to simultaneously reset all of the non-volatile memories associated with one chip enable, but not all of the non-volatile memories in the non-volatile storage device 140.

Determining the current consumption necessary to reset the non-volatile memories may include determining the quantity of non-volatile memories that may be simultaneously reset, determining a type of each of the non-volatile memories, or determining a manufacturer of each of the non-volatile memories. Information on the quantity of non-volatile memories, their type, and the manufacturer, may be obtained by reading information in a database stored in the controller or elsewhere in the non-volatile storage device 140, or, in another example, by querying one or more of the non-volatile memories 160-196 to obtain the necessary information.

Information about the quantity, type, and manufacturer of the non-volatile memories, either individually or in combination, may permit the controller 144 to determine the power consumption (system inrush current) resulting from resetting two or more of the non-volatile memories simultaneously. For example, the controller 144 may obtain information about the type or manufacturer of non-volatile memory 160-196, and consult a look-up table or database stored in the non-volatile storage device 140, such as in the controller 144, a non-volatile memory 160-196, or another memory in the non-volatile storage device 140, in order to determine the power consumption associated with a reset of one non-volatile memory 160-196. The look-up table or database may also be stored outside of the non-volatile storage device 140, such as in the host 110 or in another device in communication with the non-volatile storage device 140. In another example, the controller 144 may simply read power consumption information directly from a database without using a cross-reference or lookup table based on the device type or manufacturer. The controller 144 may use this information, in conjunction with information about the quantity of non-volatile memories 160-196 that could be reset in parallel, to compute a sum that represents a power consumption peak or maximum power consumption average over a predetermined period.

Control passes to step 206, where the controller 144 compares determined current consumption with a current consumption threshold. The current consumption threshold may be established by a small form factor memory card manufacturer. In another example the current consumption threshold may be defined or said by another limitation, such as the amount of power that can be supplied to the non-volatile storage device by the host 110 or by another source. The limitation may be a value stored in the non-volatile storage device 140, or may be received from the host 110 or another source. The current consumption threshold may be an instantaneous current consumption limit, and average current consumption over a period of time, or any other useful measure of the maximum amount of permissible power that may be consumed by the non-volatile storage device 140. If the determined current consumption is less than the current consumption threshold, control passes from step 206 to step 216. At step 216, all of the non-volatile memories associated with the determination and step 204 are simultaneously reset by the controller 144. In an architecture such as the architecture shown in FIG. 1, all of the memories associated with a single chip enable our simultaneously reset by inserting the corresponding chip enable and transmitting the reset command (0xFF) on the command/data bus 158. Control than passes from step 216 two complete the steps 200. In the architecture shown in FIG. 1, all or a portion of the steps 200 may be repeated once for each chip enable signal 150, 152, 154, 156 present in the non-volatile storage device 140.

Referring back to step 206, if the determined current consumption is greater than the current consumption threshold, control passes from step 206 to 208. In step 208, the controller 144 divides the non-volatile memories into subsets, where all of the memories of a subset are capable of being simultaneously reset without exceeding the current consumption threshold. For example, in an architecture similar to the architecture shown in FIG. 1, if eight identical non-volatile memories share a single chip enable signal, and it is determined that five memories may be simultaneously reset without exceeding a current consumption threshold, a subset may include anywhere from 1 to 5 non-volatile memories. Therefore the eight non-volatile memories sharing a single chip enable may be divided, in one example, into one subset of five non-volatile memories, and three subsets of one non-volatile memory each. Other subsets containing different quantities or combinations of non-volatile memories are possible. For example the non-volatile memories may be divided into four subsets, with each subset containing two non-volatile memories.

Control passes to step 210, where the controller 144 resets first subset of non-volatile memories. Control than passes to step 212, where the controller 144 determines whether other subsets are remaining. If so, control passes to step 214 to select the next subset to be reset, then to step 210 where the controller 144 resets the selected subset. The cycle of steps to 210, 212 and 214 is repeated until all of the subsets determined in step 208 have been reset. When there are no subsets remaining, control passes from 212 and the steps 200 are finished. As previously noted, if the steps 200 are used to intelligently reset only the non-volatile memories associated with a single chip enable, such as the architecture shown in FIG. 1, the steps 200 may be repeated for the remaining non-volatile memories associated with the other chip enables. When the steps 200 are repeated for the remaining non-volatile memories associated with the other chip enables, steps 204 and 206 may be skipped if it can be assumed that the current consumption determination and subset identification made for the first chip enable is applicable to the other chip enables, as would occur if each chip enable in a non-volatile storage device 140 has the same number of non-volatile memories, and the non-volatile memories are of the same type and manufacturer.

Figure 3:
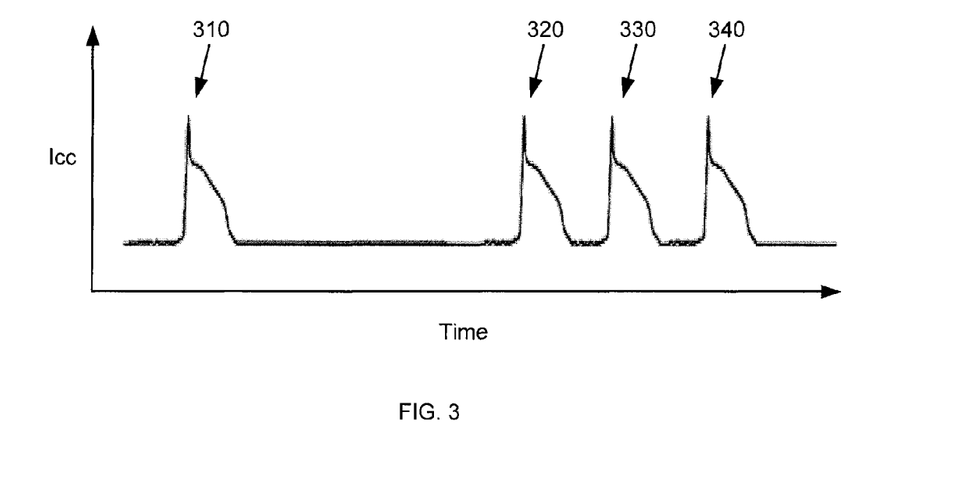
FIG. 3 is a diagram illustrating exemplary current consumption when performing non-phased reset operations in the non-volatile storage device architecture of FIG. 1.

FIG. 3 is a diagram illustrating exemplary current consumption when performing non-phased reset operations in the non-volatile storage device architecture of FIG. 1. In the exemplary current consumption diagram in FIG. 3, the non-volatile storage device contains 32 non-volatile memories and four chip enables, with eight non-volatile memories associated with each chip enable. The controller 144 is capable of sending a single reset command (0xFF) to simultaneously reset all of the eight memories coupled to each of the four chip enables, and performs this non-phased reset of sets of eight non-volatile memories in order to reset all 32 non-volatile memories in the non-volatile storage device 140. As shown in FIG. 3, a simultaneous reset of eight non-volatile memories at a time results in large current spikes 310, 320, 330, 340. Depending on the small form factor memory card standard, the maximum current consumption limits may be exceeded by simultaneously resetting too many non-volatile memories at the same time.

Figure 4:
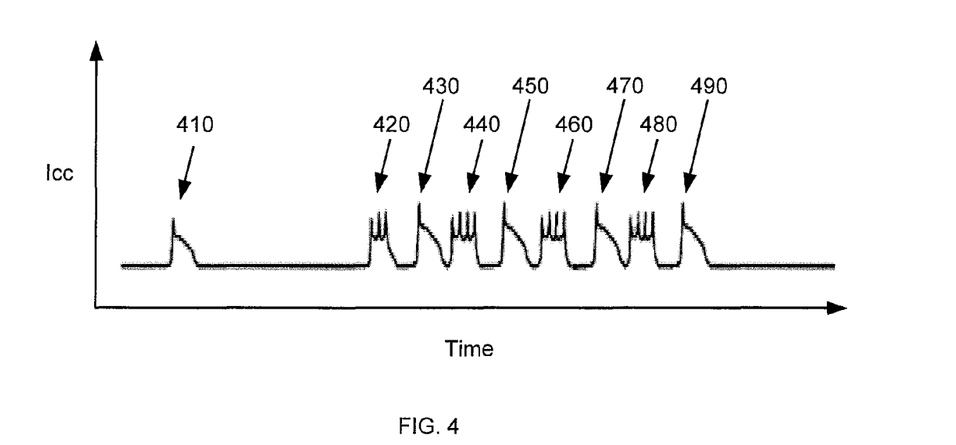
FIG. 4 is a diagram illustrating exemplary current consumption when performing phased reset operations in the non-volatile storage device architecture of FIG. 1.

FIG. 4 is a diagram illustrating exemplary current consumption when performing phased reset operations in the non-volatile storage device architecture of FIG. 1. In the exemplary current consumption diagram in FIG. 4, the non-volatile storage device includes eight non-volatile memories per chip enable. In the exemplary non-volatile storage device used to produce the current consumption diagram of FIG. 4, the non-volatile storage device controller has determined that four non-volatile memories may be simultaneously reset without exceeding a current consumption threshold. In order to reset the remaining non-volatile memories associated with the chip enable, the controller uses an available die-specific reset command to individually reset the other memories associated with a chip enable. Therefore, in the example shown in FIG. 4, the controller may reset the eight memories associated with a chip enable by individually resetting four of the eight memories, followed by a simultaneous reset of the remaining four memories in a chip enable. Other combinations are possible depending on the flexibility of the device architecture and the command set available to the controller. For example, if permitted by the command set and the architecture of the non-volatile storage device, the controller may issue four sequential reset commands to reset two non-volatile memories at a time, in order to reset the eight non-volatile memories associated with the chip enable.

In the example shown in FIG. 4, the information that the controller uses to determine a reset strategy is stored in one non-volatile memory associated with one chip enable. This non-volatile memory must be reset first so that the controller can read information from it in order to determine a reset strategy. It is assumed that this non-volatile memory can be individually reset without exceeding a current consumption threshold. The information stored in this non-volatile memory first reset by the non-volatile memory controller may include information on the quantity of devices associated with a chip enable, and the type and/or manufacturer of non-volatile memories used in the non-volatile storage device. The non-volatile memory may also include a lookup table or database that may allow the controller to compute a current consumption total based on the quantity, type, and device manufacturer information.

In another embodiment not shown in FIG. 4, it is not necessary to initially reset one of the non-volatile memories if the information that the controller requires to determine a reset strategy is stored outside of the non-volatile memories that will be reset by the controller using the determined strategy.

As explained above, the first current spike 410 in FIG. 4 is associated with resetting a single non-volatile memory device associated with one chip enable, so that the controller to send commands to that non-volatile memory in order to retrieve information about the manufacturer and type of device, which may be assumed to be the same for all of the non-volatile memories in the system. The single non-volatile memory device that is reset before the others may also contain information about the number of non-volatile memories associated with each chip enable. Using some or all of this information, the controller may determine whether all of the non-volatile memories associated with a chip enable may be simultaneously reset. In the example shown in FIG. 4, the controller 144 determines that four non-volatile memories may be simultaneously reset. The controller 144 then creates five subsets, including one subset of four non-volatile memories and four subsets of one non-volatile memory. As previously explained, other combinations of subsets are possible depending on the capability of the non-volatile storage device architecture and the reset commands available to the controller 144. The three current spikes 420 followed by a single current spike 430 illustrate the controller 144 resetting the remaining seven memories associated with the first chip enable. Specifically, the three current spikes 420 are the controller 144 individually resetting three non-volatile memories, and the larger single current spike 430 shows the controller simultaneously resetting the four remaining non-volatile memories associated with the first chip enable.

The controller 144 then individually resets four non-volatile memories associated with the next chip enable, as shown by the four current spikes 440, followed by a larger current spike 450, which is the controller simultaneously resetting the remaining four memories associated with the next chip enable. This process is repeated for the remaining two chip enables in the non-volatile storage device 140, as illustrated by the current spikes 460, 470, 480, and 490. Although the example of FIG. 4 shows a specific reset capability where the non-volatile device is capable of resetting either a single non-volatile memory, or the remaining non-volatile devices associated with a chip enable that have not been reset, other devices may include more flexible or different controllability such that different combinations or orderings of non-volatile device resets are possible.

Comparing the current consumption in FIG. 4 with the current consumption in FIG. 3, it is evident that the reducing the number of memories simultaneously reset may substantially reduce the peak current consumption and the maximum current consumption over a period of time, thereby allowing all of the non-volatile memories in the non-volatile storage device to be reset without exceeding a current consumption threshold.

An intelligent controller that divides a power-intensive parallel operation into a sequence of steps may be utilized in other applications outside of small form factor memory cards, or where the parallel operation may include performing a power-intensive operation across devices that are not identical or that do not have similar power consumption characteristics. In these applications, the fundamental steps performed by the controller as explained above are still applicable. Specifically, the controller coordinating a power-intensive operation may gather information about the power consumption characteristics of the devices that will perform the power-intensive operation, determine if the total power consumption is greater than a threshold if the controller directs the devices to simultaneously perform the operation, and if so dividing the devices into subsets that will perform the power-intensive operation sequentially or in a phased fashion. The devices in a subset perform the power-intensive operation in parallel without exceeding a current consumption threshold. When one subset completes the power-intensive operation, the next subset may begin to perform the power-intensive operation. The divided power-intensive operation is complete when all of the subsets have performed the power-intensive operation.

Figure 5:
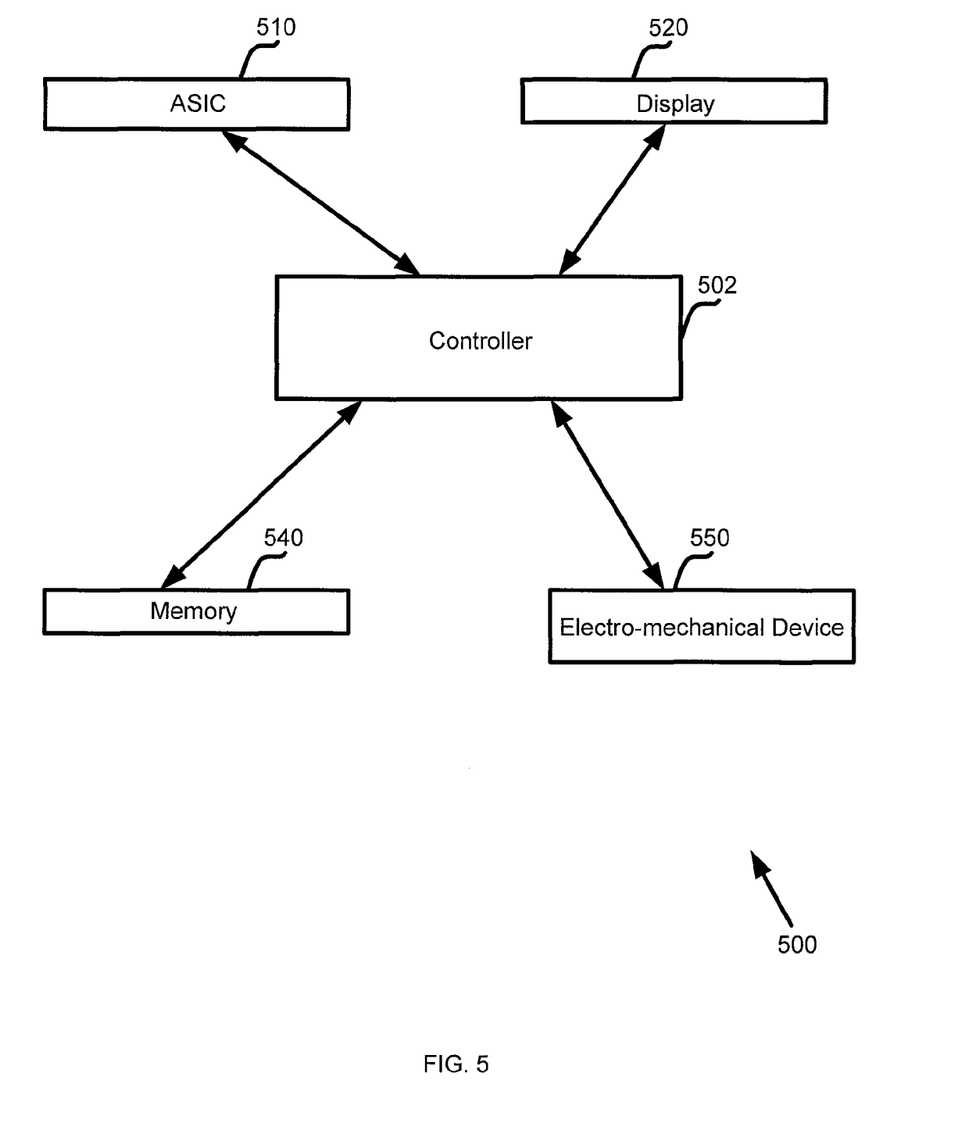
FIG. 5 is a diagram illustrating an exemplary system for performing a phased power-intensive operation.

FIG. 5 is a diagram illustrating an exemplary system 500 for performing a phased power-intensive operation. A controller 502 may be in communication with a number of system devices, such as an ASIC 510, a display 520, a memory 540, and an electromechanical device 550. The controller 502, for example, may be a power management integrated circuit on a printed circuit assembly (PCA). In another example, the controller 502 may be another integrated circuit or ASIC in communication with the aforementioned devices 510, 520, 540, 550. The controller 502 may receive a request to perform a power-intensive operation, such as a reset, or may determine on its own that a power-intensive operation is required. The controller 502 may be capable of completing the power-intensive operation simultaneously by transmitting a signal or an instruction to the ASIC 510, the display 520, the memory 540, the electro-mechanical device 550. Before doing so, the controller 502 may calculate the system power requirements necessary for all of the components to complete the power-intensive operation commanded by the controller 502. The calculation may be determined based on information stored by the controller 502, or received by the controller 502 in response to querying the ASIC 510, the display 520, the memory 540, the electromechanical device 550, or any other source. The retrieved information may include the manufacturer of the device, the type of device, or other power consumption information. If the power requirements exceed a current consumption threshold, the controller may divide the operation into subsets, and may send instructions or transmit signals sequentially to each subset of system components to allow the power-intensive operation to be completed without exceeding a power consumption threshold.

For example, if the electromechanical device 550 is a disk drive, the controller 502 may determine that resetting the electromechanical device 550 at the same time that the display 520 is being reset may exceed a current consumption threshold. The controller 502 may determine that the ASIC 510, the display 520, and the memory 540 may be simultaneously reset without exceeding a current consumption threshold, and that the electromechanical device 550 may be individually reset without exceeding a current consumption threshold. Upon making this determination, the controller 502 may then reset the electromechanical device 550, followed by simultaneously resetting the ASIC 510, display 520, and memory 540. In doing so, the controller may complete the power-intensive operation without exceeding a current consumption limit present in the system 500.

As shown in the exemplary embodiments contained above figures and accompanying description, a method and system for intelligently computing the power consumption requirements for performing power-intensive operations is disclosed. Once the power consumption requirements associated with a power-intensive operation are computed, a controller may utilize this information to determine whether the power-intensive operation may be performed without exceeding a current consumption threshold, such as an instantaneous peak power, or an average power over a period of time. If the controller determines that the power-intensive operation may not be performed in parallel without exceeding a current consumption threshold, the controller may intelligently break up the power-intensive operation into steps that may be performed sequentially without exceeding a current consumption threshold.

For example, in a small form factor memory card, the controller may detect the number of non-volatile memories coupled to a single chip enable line, and determine if all of the non-volatile memories coupled to a single chip enable line may be simultaneously reset without exceeding a current consumption threshold (such as peak or average inrush current). If the controller determines that all of the non-volatile memories cannot be reset, the controller may then intelligently divide the non-volatile memories into subsets that may be safely reset simultaneously. Once the subsets are identified, the controller may then reset each subset, and avoid the risk of exceeding a current consumption threshold established by the small form factor memory card standard. Such a flexible controller may be utilized with a variety of memory configurations, including quantities of non-volatile memories, non-volatile memory manufacturers, and non-volatile memory types or part numbers. Such a controller may also be utilized in different small form factor memory card types, where the controller applies current consumption threshold information corresponding to the particular relevant standard. Because the controller has this flexibility, the cost for designing, testing, and maintaining custom controller designs for each application may be avoided.

While many of the foregoing examples and embodiments apply to small form factor memory cards and power-on reset operations, the methods and systems disclosed herein are applicable to any power-intensive operation and any system application where the parallel operation has the potential to consume too much power, and where the parallel operation can be divided into two or more sequential steps in order to avoid exceeding a power consumption threshold.

Although the invention has been described with respect to various system and method embodiments, it will be understood that the invention is entitled to protection within the full scope of the appended claims.

The invention claimed is:

1. A method for resetting a non-volatile storage device, the method comprising:
performing, by a controller in a non-volatile storage device, the controller in communication with a plurality of non-volatile memories in the non-volatile storage device:
in response to detecting a power reset, determining a current consumption necessary to reset the plurality of non-volatile memories in the non-volatile storage device;
simultaneously resetting all of the plurality of the non-volatile memories when the determined current consumption is less than a current consumption threshold; and
when the determined current consumption is greater than the current consumption threshold:
resetting a first subset of the plurality of non-volatile memories; and
after a predetermined delay, resetting a second subset of the plurality of non-volatile memories.

2. The method of claim 1, wherein when the determined current consumption indicates that simultaneously resetting at least half of the plurality of the non-volatile memories would exceed the current consumption threshold, resetting a third subset of the plurality of non-volatile memories a second predetermined delay after the second subset the plurality of non-volatile memories has been reset.

3. The method of claim 1, wherein determining the current consumption necessary to reset the plurality of non-volatile memories in the non-volatile storage device comprises determining whether a quantity of the plurality of non-volatile memories exceeds a predetermined number.

4. The method of claim 1, wherein determining the current consumption necessary to reset the plurality of non-volatile memories in the non-volatile storage device comprises determining a type of the plurality of non-volatile memories.

5. The method of claim 1, wherein determining the current consumption necessary to reset the plurality of non-volatile memories in the non-volatile storage device comprises determining a manufacturer of the plurality of non-volatile memories.

6. The method of claim 1, wherein each of the plurality of non-volatile memories is resettable by a reset command, and wherein resetting the first subset of the plurality of non-volatile memories comprises transmitting a reset command to the first subset of the plurality of non-volatile memories.

7. A non-volatile storage device, comprising:
a plurality of non-volatile memories;
a controller in communication with the plurality of non-volatile memories, the controller operable to:
in response to detecting a power reset, determine a current consumption necessary to reset the plurality of non-volatile memories in the non-volatile storage device;
simultaneously reset all of the plurality of the non-volatile memories when the determined current consumption is less than a current consumption threshold; and
when the determined current consumption is greater than the current consumption threshold:
reset a first subset of the plurality of non-volatile memories; and
after a predetermined delay, reset a second subset of the plurality of non-volatile memories.

8. The non-volatile storage device of claim 7, wherein the determined current consumption indicates that simultaneously resetting at least half of the plurality of the non-volatile memories would exceed the current consumption threshold, and wherein the controller is further operable to reset a third subset of the plurality of non-volatile memories a second predetermined delay after the second subset the plurality of non-volatile memories has been reset.

9. The non-volatile storage device of claim 7, wherein determining the current consumption necessary to reset the plurality of non-volatile memories in the non-volatile storage device comprises determining whether a quantity of the plurality of non-volatile memories exceeds a predetermined number.

10. The non-volatile storage device of claim 7, wherein determining the current consumption necessary to reset the plurality of non-volatile memories in the non-volatile storage device comprises determining a type of the plurality of non-volatile memories.

11. The non-volatile storage device of claim 7, wherein determining the current consumption necessary to reset the plurality of non-volatile memories in the non-volatile storage device comprises determining a manufacturer of the plurality of non-volatile memories.

12. The non-volatile storage device of claim 7, wherein each of the plurality of non-volatile memories is resettable by a reset command, and wherein resetting the first subset of the plurality of non-volatile memories comprises transmitting a reset command to the first subset of the plurality of non-volatile memories.

13. A method for resetting a system, the method comprising:
performing, by a controller in a system, the controller in communication with a set of system components:
in response to detecting a power reset, determining a current consumption necessary to reset the set of system components in the system;
simultaneously resetting all of the set of system components when the determined current consumption is less than a current consumption threshold; and
when the determined current consumption is greater than the current consumption threshold:
identifying a first subset of system components that can be reset simultaneously without exceeding the current consumption threshold;
resetting the first subset of system components;
identifying a second subset of system components that can be reset simultaneously without exceeding the current consumption threshold; and
resetting the second subset of system components.

14. The method of claim 13, wherein when determining the current consumption necessary to reset the set of system components in the system comprises determining whether a quantity of system components exceeds a predetermined number.

15. The method of claim 13, wherein determining the current consumption necessary to reset the set of system components in the system comprises determining a type of each of the system components.

16. The method of claim 13, wherein determining the current consumption necessary to reset the set of system components in the system comprises determining a manufacturer of each of the system components.

* * * * *